United States Patent [19]
Croslin et al.

[11] Patent Number: 5,941,992
[45] Date of Patent: Aug. 24, 1999

[54] DISTRIBUTED METHOD AND SYSTEM FOR EXCLUDING COMPONENTS FROM A RESTORAL ROUTE IN A COMMUNICATIONS NETWORK

[75] Inventors: William D. Croslin; Steve Sellers, both of Colorado Springs, Colo.; Mark Sees, Plano, Tex.

[73] Assignee: MCI Communications Corporation

[21] Appl. No.: 08/910,912

[22] Filed: Aug. 13, 1997

[51] Int. Cl.$^6$ .................................................. H04J 3/14
[52] U.S. Cl. ............................... 714/4; 370/225; 370/228
[58] Field of Search ........................... 714/2, 4; 709/238, 709/239; 370/217, 221, 225, 228

[56] References Cited

U.S. PATENT DOCUMENTS

| | | | |
|---|---|---|---|
| 4,577,066 | 3/1986 | Bimonte et al. . | |
| 4,920,529 | 4/1990 | Sasaki et al. . | |
| 5,146,452 | 9/1992 | Pekarske | 370/16 |
| 5,187,740 | 2/1993 | Swaim et al. | 379/209 |
| 5,333,130 | 7/1994 | Weissmann et al. | 370/16 |
| 5,335,268 | 8/1994 | Kelly, Jr. et al. | 379/112 |
| 5,459,716 | 10/1995 | Fahim et al. . | |
| 5,463,615 | 10/1995 | Steinhorn . | |
| 5,548,639 | 8/1996 | Ogura et al. | 379/221 |
| 5,636,203 | 6/1997 | Shah | 370/244 |
| 5,646,936 | 7/1997 | Shah et al. | 370/228 |
| 5,832,196 | 6/1996 | Croslin et al. | 395/182.02 |
| 5,835,482 | 9/1996 | Allen | 370/225 |
| 5,841,759 | 1/1997 | Russ et al. | 370/221 |

FOREIGN PATENT DOCUMENTS 0 494 513 A2 12/1991 European Pat. Off. .

WO 95/10149 8/1995 WIPO .

OTHER PUBLICATIONS

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

(List continued on next page.)

*Primary Examiner*—Hassan Kizou
*Assistant Examiner*—Omar A. Omar

[57] ABSTRACT

A distributed method and system for excluding segments from use in bypassing a failed component. Prior to failure of a segment, the restoration system at a central location identifies each path in the communications network. A path is a unique sequence of installations that a segment traverses. The restoration system then creates a mapping of the ports of the restoration nodes to the paths of the segments connected to each port. The restoration system then identifies for each path the set of paths that are interdependent. A pair of paths are interdependent when both paths traverse a common pair of installations. The restoration system then downloads to each restoration node the mappings for its ports along with an indication of the paths that are interdependent with the path of each segment connected to the restoration node. Following failure of a segment, the restoration node that detects the failure uses the downloaded mapping to identify the failed path and notifies the other restoration nodes of the failed path. The restoration system at each restoration node then excludes each segment that has a path that is interdependent with the failed path when implementing a restoral route.

16 Claims, 8 Drawing Sheets

OTHER PUBLICATIONS

Grover et al. "Near Optimal Spare Capacity Planning in a Mesh Restorable Network" IEEE Jan. 1991.

Hasegawa et al. "Dynamic Reconfiguration of Digital Cross--Connect Systems with Network Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1992.

Newport, et al. "Network Survivability Through Connectivity Optimization" IEEE 1987.

Flanagan et al. "Principles and Technologies for Planning Survivability—A Metropolitan Case Study", IEEE 1989.

M. Wehr "Protection of Synchronous Transmission Networks", Commutation and Transmission, No. 4, 1993.

Coan, et al. "Using Distributed Topology Update and Pre-planned Configurations to Achieve Trunk Network Survivability" IEEE Oct. 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

| Port | Path |
|---|---|
| 1 | e' |
| 2 | a' |
| 3 | d' |
| 4 | e' |
| 5 | f' |
| 6 | g' |
| 7 | h' |
| 8 | h' |
| 9 | a' |
| 10 | b' |
| 11 | h' |
| 12 | h' |
| 13 | j' |
| 14 | k' |
| 15 | f' |
| 16 | b' |
| 17 | d' |
| 18 | c' |
| 19 | j' |
| 20 | g' |
| 21 | c' |
| 22 | k' |

FIG. 2A

| Port | Path |
|---|---|
| 15 | f' |
| 16 | b' |
| 17 | d' |
| 18 | c' |

FIG. 2B

| PathID | Path Route | Interdependent Path Sets |
|---|---|---|
| a' | A'-B' | a' |
| b' | B'-C' | b',d',f',g' |
| c' | C'-D' | c',g',j' |
| d' | A'-G'-B'-C' | d',b',f',g' |
| e' | A'-E' | e' |
| f' | E'-B'-C' | f',b',d',g' |
| g' | E'-B'-C'-D' | g',b',c',d',f',j' |
| h' | E'-F' | h' |
| j' | F'-C'-D' | j',c',g' |
| k' | F'-D' | k' |

FIG. 3A

| PathID | Path Route | Interdependent Path Sets |
|---|---|---|
| b' | B'-C' | b',d',f',g' |
| c' | C'-D' | c',g',j' |
| d' | A'-G'-B'-C' | d',b',f',g' |
| f' | E'-B'-C' | f',b',d',g' |

FIG. 3B

| Fail Loc | Group | Interdependent Path Sets | Common Paths |
|---|---|---|---|
| 103 | e' | e' | e' |
| 104 | d' | d',b',f',g' | b',d',f',g' |
| 105 | d' | d',b',f',g' | b',d',f',g' |
| 106 | h' | h' | h' |
| 107 | b' | b',d',f',g' | b',d',f',g' |
| 107 | d' | d',b',f',g' | b',d',f',g' |
| 107 | f' | f',b',d',g' | b',d',f',g' |
| 107 | g' | g',b',c',d',f',j' | b',c',d',f',g',j' |
| 107 | b' d' | b',d',f',g' d',b',f',g' | b',d',f',g' |
| 107 | b' f' | b',d',f',g' f',b',d',g' | b',d',f',g' |
| 107 | b' g' | b',d',f',g' g',b',c',d',f',j' | b',d',f',g' |
| 107 | d' f' | d',a',b',f',g' f',b',d',g' | b',d',f',g' |
| 107 | d' g' | d',b',f',g' g',b',c',d',f',j' | b',d',f',g' |
| 107 | f' g' | f',b',d',g' g',b',c',d',f',j' | b',d',f',g' |
| 107 | b' d' f' | b',d',f',g' d',b',f',g' f',b',d',g' | b',d',f',g' |
| 107 | b' f' g' | b',d',f',g' f',b',d',g' g',b',c',d',f',j' | b',d',f',g' |
| 107 | d' f' g' | d',b',f',g' f',b',d',g' g',b',c',d',f',j' | b',d',f',g' |
| 107 | b' d' f' g' | b',d',f',g' d',b',f',g' f',b',d',g' g',b',c',d',f',j' | b',d',f',g' |
| 108 | c' | c',g',j' | c',g',j' |
| 108 | g' | b',b',c',d',f',j' | b',c',d',f',g',j' |
| 108 | j' | j',c',g' | c',g',j' |
| 108 | c' g' | c',g',j' g',b',c',d',f',j' | c',g',j' |
| 108 | c' j' | c',g',j' j',c',g' | c',g',j' |
| 108 | g' j' | b',c',d',f',j' j',c',g' | c',g',j' |
| 108 | c' g' j' | c',g',j' g',b',c',d',f',j' j',c',g' | c',g',j' |
| 109 | f' | f',b',d',g' | b',d',f',g' |
| 109 | g' | g',b',c',d',f',j' | b',c',d',f',g',j' |
| 109 | f' g' | f',b',d',g' g',b',c',d',f',j' | b',d',f',g' |
| 110 | k' | k' | k' |
| 111 | a' | a' | a' |
| 112 | j' | j',c',g' | c',g',j' |

FIG. 4

| Restoral Routes For By-Passing Segment b |
|---|
| e,f,c |
| d,c |
| e,g |
| e,h,j |
| e,i,j |
| e,h,k |
| e,i,k |

DISTRIBUTED METHOD AND SYSTEM FOR EXCLUDING COMPONENTS FROM A RESTORAL ROUTE IN A COMMUNICATIONS NETWORK

CROSS-REFERENCE TO RELATED APPLICATIONS

This application is related to the following U.S. patent applications Ser. Nos. 08/910,911 and 08/910,617, which are being filed concurrently and are hereby incorporated by reference: CENTRALIZED METHOD AND SYSTEM FOR EXCLUDING COMPONENTS FROM A RESTORAL ROUTE IN A COMMUNICATIONS NETWORK and METHOD FOR INITIATING A DISTRIBUTED RESTORATION PROCESS.

TECHNICAL FIELD

The present invention relates to communication networks and, in particular, to the restoration of failed communication networks.

BACKGROUND OF THE INVENTION

Telecommunications carriers (e.g., long distance providers) continually strive to increase the reliability of their communications networks. They do this, in part, by increasing the speed by which they can restore network operation following failure in one or more components of the network. A communications network consists of a collection of transmission links, also known as segments, that are interconnected at network nodes. The segments include transmission lines, fiber optic cables, microwave links, and other such transmission medium. Traffic is transmitted on the network from one endpoint to another endpoint through a current route or "trunk," which is a network path of segments that interconnect the endpoints. The network nodes may serve a variety of functions such as amplifying the network traffic for transmission down the next segment in the route or establishing an interconnection between two segments connected to the node (i.e., a switch). Each node is located at an installation, and several nodes may be located within a single installation. The restoration nodes can be controlled locally or from a remote computer system to connect or to disconnect segments that are connected to the node. Segments are connected to individual ports of a restoration node.

Unfortunately, the components (e.g., nodes and segments) of the communications network may occasionally fail. For example, a segment that is a buried fiber optic cable may fail as a result of being inadvertently severed by someone digging near the buried cable. If one or more of the cables fail, massive disruption of services to a large number of network customers could result. Therefore, telecommunications carriers strive to quickly and economically route the network traffic around such failed components by establishing a "restoral" route. A restoral route is a combination of segments between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers. A plan that identifies which restoration nodes are to be switched to bypass one or more specific failed components is called a "restoration plan."

Communications networks typically have excess capacity that can be used to bypass a failed component. The segments of a network that are currently being used to bear traffic are referred to as active segments, and the segments that are not being currently used to bear traffic (i.e., excess capacity) are referred to as spare segments. Restoral routes are implemented by identifying spare segments and incorporating certain of those spare segments into the network.

In common communications networks, segments are often physically collocated in larger components such as cables. In many instances, when one segment of the larger component fails, it is likely that the remaining segments of the larger component will also fail within a reasonably short amount of time. For example, if a cable catches on fire, the cable may end up being burned through, damaging all the segments within the cable. Initially, as the cable is being burned, perhaps only one or two segments on the periphery of the cable will be burned. As the heat intensifies and the fire progresses, the remaining segments will each be successively burned through and fail. It would be desirable for communications carriers to devise restoration plans in which spare segments that are not physically collocated with a failed segment are used to build a restoral route. The use of such spare segments would decrease the chance that the restoral route identified in the restoration plan will itself fail due to cascading failures of a cable that includes both the failed segment and the spare segment.

SUMMARY OF THE INVENTION

The present invention provides a distributed method and system for excluding segments from use in restoring a communications network following a failure. The restoration system of the present invention starts the restoration process when a failure of a segment in the communications network is detected. Each restoration node is notified of the segment that failed. The restoration system at each node then identifies each segment that is connected to the restoration node and that is collocated with at least a portion of the failed segment. Segments are collocated when they traverse at least one common pair of installations. The restoration system at each node then excludes from using in restoring the communications network the identified segments. Prior to failure of a segment, the restoration system at a central location identifies each path in the communications network. A path is a unique sequence of installations that a segment traverses. The restoration system then creates a mapping of the ports of the restoration nodes to the paths of the segments connected to each port. The restoration system then identifies for each path the set of paths that are interdependent. A pair of paths are interdependent when both paths traverse a common pair of installations. The restoration system then downloads to each restoration node a mapping of its ports to the path of the segments connected to the restoration node and the identification of the interdependent paths for the path of each segment that is connected to the restoration node. Following failure of a segment, the restoration system uses the port on which the failure was detected and uses the mapping to identify the path of the segment that failed. The restoration system then excludes each restoral route that includes a segment that has a path that is interdependent with the failed segment.

BRIEF DESCRIPTION OF THE DRAWINGS

FIGS. 2A-2B illustrate the port/path table for the example network.

FIGS. 3A-3B illustrate the interdependent path table for the example network.

FIG. 4 illustrates the various groups of interdependent paths.

FIG. 5 illustrates a table of restoral routes to bypass active segment b.

DETAILED DESCRIPTION OF THE INVENTION

Figure 1:
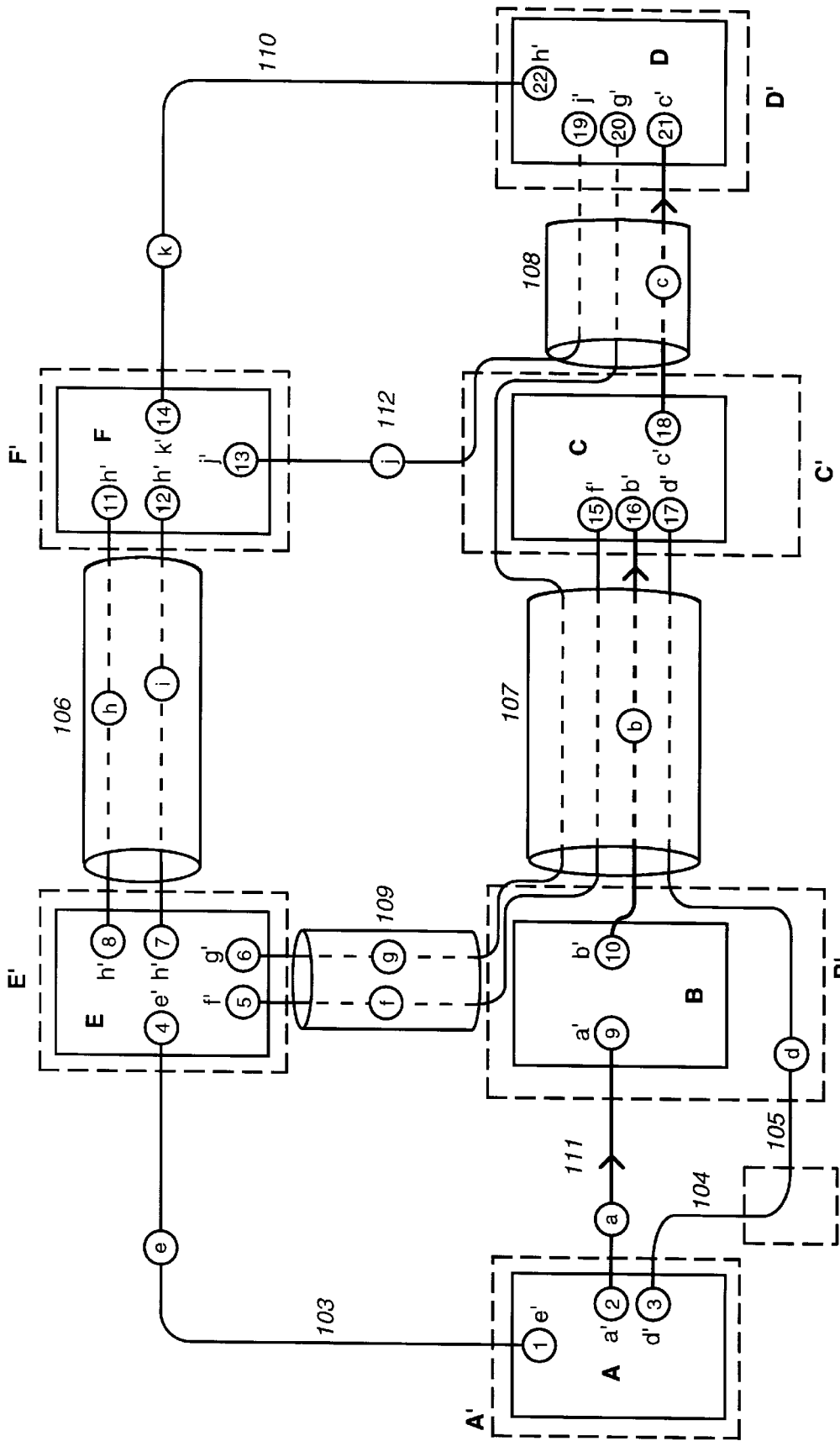
FIG. 1 illustrates an example communications network comprising installations, restoration nodes, and segments.

The present invention provides a distributed method and system for excluding network components that may fail when restoring a failed communications network. When a failure occurs in a component (e.g., network segment), the restoration system of each restoration node is notified and attempts to identify between which two installations in the communications network the segment has failed. The restoration system at each restoration node identifies the spare segments that are connected to the restoration node and for which at least a portion of the segment traverses those two identified installations. When building a restoral route, the restoration system at each restoration node excludes the identified spare segments from use in building the restoral route. In this way, if a cable that contains multiple segments is damaged (e.g., the cable is burning), then all spare segments within that cable are assumed to also have failed. In certain cases, the restoration system may not be able to pinpoint the failure to between which two installations. For example, if a segment traverses several installations and an alarm is detected for that segment, the failure could have occurred between any two of the several adjacent installations. In such a case, the restoration system assumes that a failure has occurred between each pair of adjacent installations. The restoration system, thus, excludes from the restoration process all segments that also traverse at least one of the pairs of adjacent installations. The distributed restoration system then builds a restoral route without the excluded segments.

When multiple failures are detected, the restoration system at each restoration may be able to eliminate certain of the pairs of adjacent installations as possible locations of the failure. For example, portions of two segments may traverse the same two installations, but another portion of each segment may also traverse different pairs of adjacent installations. If a failure is detected for only one of the segments, the restoration system cannot pinpoint between which pair of adjacent installations. However, when a failure is detected on both of these segments, then the restoration system can pinpoint that the failure occurred between the pair of adjacent installations that both failed segments traverse. In this way, the restoration system limits the segments that are excluded from possible restoral routes to only those segments that traverse the identified pair of installations.

To help pinpoint the location of a failure, the restoration system preferably at a central location initially identifies all paths within the communications network. Each path has a path route that identifies the installations that the segments of that path traverse. For example, if a segment starts at installation A', passes through installation B', and ends at installation C', then the path route is A'-B'-C'. The restoration system then identifies for each path the set of paths that have at least one pair of adjacent installations in common with the path. For example, a path with a path route of B'-C'-D' shares adjacent installations B'-C' with the path with a path route A'-B'-C'. Two paths that traverse the same pair of installations are said to be interdependent. The paths are interdependent in the sense that if a failure is detected on a segment but cannot be further pinpointed, then all paths that are interdependent with the path of the segment that failed are also considered to have failed. Thus, each path has a set of interdependent paths (including the path itself) such that, if a segment on the path fails, then segments on all the paths in the set are excluded from possible restoral routes (unless the failure can be pinpointed more precisely). The restoration system at the central location downloads to each restoration node the identification of the paths that are interdependent with each segment connected to the restoration node. When failures are detected on two segments on different paths, the restoration system at each restoration node determines whether the two paths are interdependent based on information stored locally. If the two paths are interdependent, then the restoration system then analyzes the sets of interdependent paths for the two failed paths. The restoration system determines whether there are any paths in the sets of interdependent paths that are common to each set. If so, then the restoration system excludes the segments in those common paths from the restoration process. So, in general, if a failure is detected on two segments, then any paths that may traverse a pair of installations that both segments also traverse is excluded.

FIG. 1 illustrates an example communications network comprising installations, restoration nodes, and segments. The network includes 7 installations A'-G' and 6 restoration nodes A-F. Each restoration node includes the distributed portion of the restoration system and is included in an installation. For example, restoration nodes B and C are in installations B' and C', respectively. Installations may contain telecommunications equipment other than restoration nodes. For example, installation G' contains no restoration node but may contain a regenerator to amplify the transmission. There are 22 ports contained in the six restoration nodes. Small circles circumscribe the port numbers of the ports in each restoration node. For example, port 1 is located in restoration node A. The segments of the network appear as lines labeled with the lower-case letters a–k within a circle. For example, segment e connects restoration node A with restoration node E through port 1 and port 4. Each pair of installations has an inter-installation cable 103–112. For example, inter-installation cable 103 connects installation A'–E' and inter-installation cable 104 connects installations A' and G'. The inter-installation cables 106–109 are shared by various segments. For example, inter-installation cable 109 is shared by segments f and g. Each of the paths of the network are identified by a primed lower-case letter. For example, the path between restoration nodes A and E is identified as path e', as indicated by the e' next to the port numbers 1 and 4. Since segments h and i connect restoration nodes E and F, they both are on the same path h'.

The network shown in FIG. 1 has many interdependent paths. The network connects restoration node A to restoration node D. The active segments of the network, as currently configured, are segments a–c. If cable 107 that contains segment b is being burned through, then segments d, f, and g, which are physically collocated with segment b, should not be included in a restoral route because they will probably fail as well. Instead, a restoral route through restoration nodes E and F should be chosen. When the restoration system detects that path b' has failed (e.g., through an alarm at port 16), it identifies the interdependent paths as d', f', and g'. Since each of the paths only have adjacent installations B' and C' in common, the restoration system excludes all segments that traverse installations B' and C' from the restoration process.

To help pinpoint the location of a failure, the restoration system at each restoration node maintains a cross reference between its ports and the path of the segment to which it is connected. This cross reference is referred to as the port/path table. FIGS. 2A-2B illustrate the port/path table for the example network. FIG. 2A illustrates a combined port/path table for all the restoration nodes, and FIG. 2B illustrates the port/path table for restoration node C. The port/path table contains an entry for each port in the network that is connected to a segment. The entry identifies the path of the segment that is connected to the port. For example, port 1 in restoration node A is connected to segment e. Since segment e is on path e', the entry for port 1 in the port/path table identifies path e'. Similarly, port 4 in restoration node E is also connected to segment e. Therefore, the entry in the port/path table for port 4 identifies path e'.

The restoration system maintains a table that identifies sets of interdependent paths, referred to as the interdependent path table. FIGS. 3A and 3B illustrate the interdependent path table for the example network. FIG. 3A illustrates the combined interdependent path table for all restoration nodes, and FIG. 3B illustrates the interdependent path table for restoration node C. The table contains an entry for each path in the network. The entry contains the identification of the path, the path route of the path, and the set of interdependent paths. For example, path d' starts at installation A', passes through installations G' and B', and ends at installation C'. Therefore, the entry for path d' identifies A'-G'-B'-C' as its path route. The related paths for path d'are d', b', f', and g'.

FIG. 4 illustrates the various groups of interdependent paths. A group of paths is any set of paths that have at least one pair of installations that are common to each path in the group. For example, the paths b', d', and f' form a group because each traverses installations B' and C'. If the restoration system detects a failure on several paths that form a group, then the failure can be pinpointed to pairs of installations that are common to each path in the group. Each group is identified by the paths in the group. The restoration system identifies the paths in a group by comparing sets of interdependent paths. If the sets of interdependent paths of two paths have paths in common, then those two paths are in the same group. For example, the set of interdependent paths for path b' is (b', d', f', g'), for path d' is g'). Since these sets of interdependent paths have paths in common (i.e., b', d', f', g'), then paths b', d', and f' form a group as shown in entry 401. When a failure is detected on each path of a group, then the paths that are common to the sets of interdependent paths for each path in the group are excluded from restoration. For example, paths b', d', f', and g' are common to the sets of interdependent paths for paths b', d', and f'. Thus, if a failure is detected on each of paths b', d', and f', then the common set of paths are excluded.

FIG. 5 illustrates a table of restoral routes to bypass active segment b. The restoration system identifies from the network topology these possible restoral routes to bypass segment b. If the restoration system had no way of determining whether a spare segment was collocated with failed segment b, then it might choose any of the seven restoration routes depending on the variety of criteria including cost of the restoral route, difficulty in implementing the restoral route, or other such considerations. However, by using the information contained in the interdependent paths table and the port/path table, the restoration system excludes restoral routes 501–503, which include segments that are collocated with segment b. When a failure is detected at port 16, the restoration system uses the port/path table to identify that the failure is on path b'. Since path b' is the only path that has failed, it forms a group of one path. Path b' is interdependent with paths b', d', f', and g' as indicated by the interdependent path table. Since path b' is the only path in the group, then paths b', d', f', and g' are common to the one set of interdependent paths. Thus, paths b', d', f', and g' are excluded. Since segments b, d, f, and g, which are on those excluded paths, restoral routes 501, 502, and 503, which include segments f, d, and g, respectively, are excluded. Restoral routes 504–507 do not include segments on paths b', d', f', and g', and thus are available to be used in the restoration process. These four restoral routes extend from restoration node A, pass through restoration nodes E and F, and terminate at restoration node D, bypassing failed path b' and bypassing all other segments located within cable 107.

Figure 6:
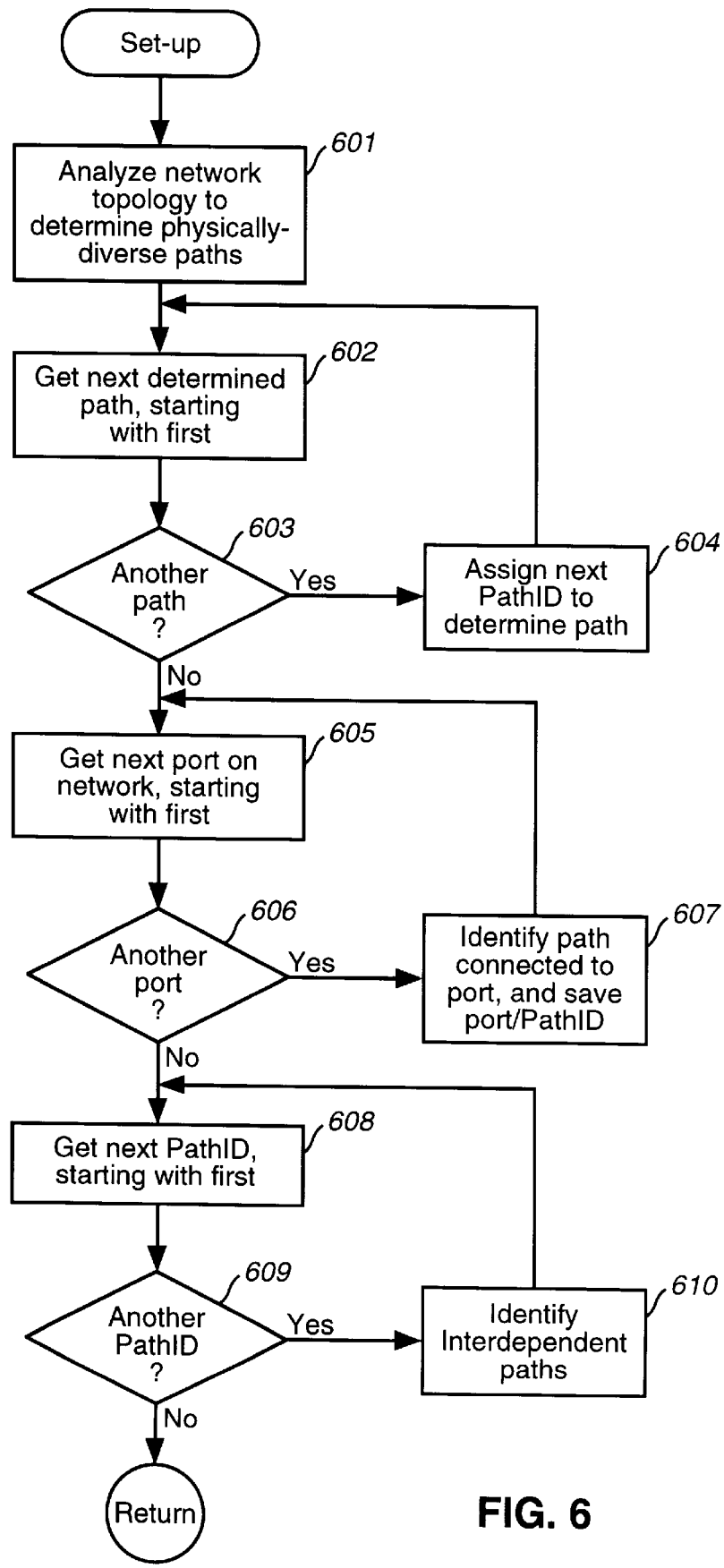
FIG. 6 is a flow diagram of the set-up component.

The restoration system comprises a set-up component and exclusion component. The set-up component analyzes the network and generates the path/port tables and interdependent path tables for each restoration node. The set-up component then downloads the tables to the restoration nodes. The exclusion component executes at each restoration node after a failure is detected and identifies those segments that are connected to the restoration node that should be excluded. FIG. 6 is a flow diagram of the set-up component. In step 601, the component analyzes the network topology to identify all the paths. In steps 602–604, the component loops assigning a unique path identifier to each path. In step 602, the component selects the next determined path, starting with the first one. In step 603, if all paths have already been selected, then the component continues at step 605, else the component continues at step 604. In step 604, the component assigns the next path identifier to the selected path. In steps 605–607, the component initializes the port/path table. In step 605, the component selects a next port from the network topology, starting with the first port. In step 606, if all the ports have already been selected, then the component continues at step 608, else the component continues at step 607. In step 607, the component identifies the path corresponding to the segment connected to that port and stores the path identification in the port/path table for the selected port. In steps 608–610, the component loops identifying sets of interdependent paths. In step 608, the component selects the next path, starting with the first. In step 609, if all the paths have already been selected, then the component is done, else the component continues at step 610. In step 610, the component identifies all the paths that are interdependent with the selected path. If a path has a pair of adjacent installations in common with the selected path, the path is interdependent. The component then stores the path identifier of the interdependent paths in the interdependent path table. The set-up component then downloads the tables to the restoration nodes.

Figure 7:
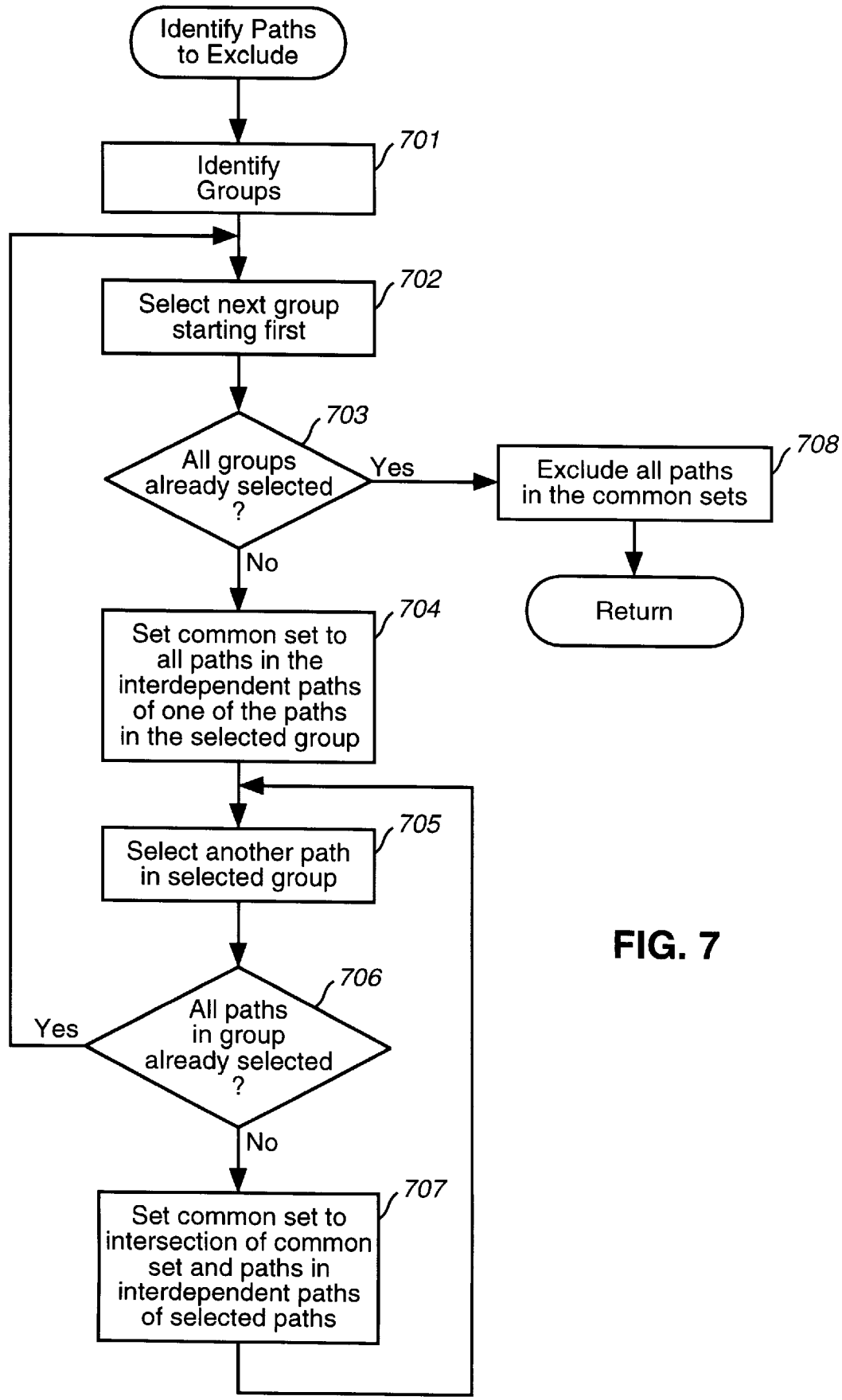
FIG. 7 is a flow diagram of the exclusion component.

FIG. 7 is a flow diagram of the exclusion component. The exclusion component executes when a restoration node determines that restoration should proceed. In step 701, the component invokes a routine to identify the groups that are defined by the failed paths. In steps 702–707, the routine loops selecting each identified group and determining the paths that are common to each set of interdependent paths of the paths in the group. In step 702, the routine selects the next group starting with the first. In step 703, if all the groups have already been selected, then the routine continues at step 708, else the routine continues at step 704. In step 704, the routine initializes a common set to all the interdependent paths of a path in the selected group. In steps 705–707, the routine loops selecting each other path in the selected group and identifies those paths that are common to the current common set and the interdependent paths of the selected path. In step 705, the routine selects another path in the selected group. In step 706, if all the paths in the selected group have already been selected, then the routine loops to step 702 to select the next group, else the routine continues at step 707. In step 707, the routine sets the current common set to the intersection of the common set and the interdependent paths of the selected paths and loops to step 705 to select another path in the selected group. In step 708, the routine excludes all paths in each common set from the restoral process.

Figure 8:
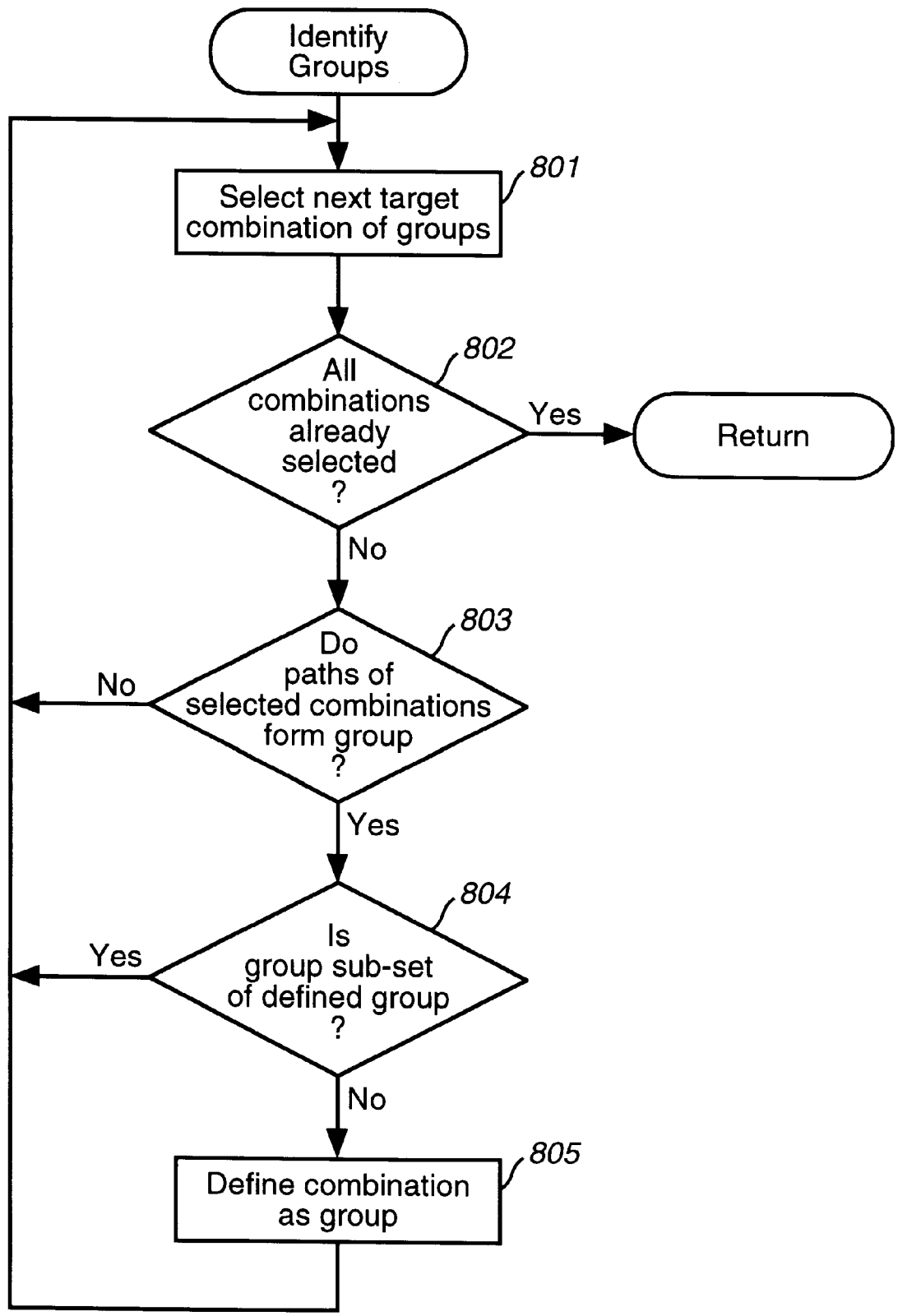
FIG. 8 is a flow diagram of a routine that identifies the groups of failed paths.

FIG. 8 is a flow diagram of a routine that identifies the groups of failed paths. The routine checks each possible combination of failed paths to determine whether they define a group. If one combination is a group that is a subset of another combination that is a group, then the subset is disregarded. The number of possible combinations of failed paths is $2^N$, where N is the number of failed paths. The routine checks the combinations in order based on the number of failed paths in the combination. In step 801, the routine selects the next combination of failed paths starting with a combination that includes all the failed paths. In step 802, if all possible combinations have already been selected, then the routine returns, else the routine continues at step 803. In step 803, if the selected combinations of paths form a group, then the routine continues at step 804, else the routine loops to step 801 to select the next combination. In step 804, if the group is a subset of a previously defined group then the routine loops to step 801 to select the next combination, else the routine continues at step 805. In step 805, the routine defines the selected combination of failed paths as a group and loops to step 801 to select the next combination of failed paths.

Although the present invention has been described in terms of one embodiment, it is not intended that the invention be limited to this embodiment. Modifications within the spirit of the invention would be apparent to those skilled in the art. For example, the present invention can be used for choosing restoral routes for any type of distributed communications network (e.g., Internet or other computer-based network). The scope of the present invention is defined by the claims that follow.

We claim:

1. A method in a computer system for determining a restoral route for a communications network following a failure of a communications network segment in a distributed manner, the communications network having segments and restoration nodes that connect one segment to another, each segment having a path that identifies installations that the segment traverses, the method comprising:

prior to a failure of a communications network segment,
identifying each path in the communications network;
assigning a unique path identifier to each identified path;
assigning to each port of each restoration node the unique path identifier of the path of the segment that is connected to the port;
for each path in the communications network, identifying its interdependent paths, wherein paths are interdependent when paths traverse a common pair of installations; and
downloading to each restoration node the path identifier assigned to each port of the restoration node and the path identifier of each path that is interdependent with a path of its ports;

following a failure of a communications network segment at each restoration node,
receiving the path identifier assigned to the port that detected the failure; and
choosing a restoral route that uses spare segments to bypass the failed segment, the restoral route including no segments that have paths that are interdependent of the failed path.

2. The method of claim 1 when, following a failure of more than one segment,
receiving the path identifiers assigned to the ports that detected the failures; and
wherein the choosing of a restoral route that uses spare segments to bypass the failed segments chooses a restoral route including no segment that has a path that is common to the sets of interdependent paths of each path of a failed segment.

3. The method of claim 2 including identifying one or more groups of paths of failed segments, such that the set of interdependent paths for each failed path in the group have at least one path in common.

4. The method of claim 3 wherein the choosing of a restoral route chooses a restoral route including no segment that has a path that is common to each set of interdependent paths of each path of a failed segment in a group.

5. A method in a computer system for excluding restoral routes from use in restoring a communications network following a failure, the method comprising:

at each restoration node of the communications network,
receiving an indication of a segment in the communications network that has failed;
identifying each segment that is collocated with at least a portion of the indicated failed segment; and
indicating as excluded from use in restoring the communications network each restoral route that uses at least one of the identified segments.

6. The method of claim 5 including
when indications of failures of multiple segments are received, determining portions of each failed segment that are collocated; and
wherein the identifying includes identifying only those segments that are collocated with a determined portion.

7. The method of claim 5 including
prior to receiving the indication of the failure of the segment,
identifying each path within the communications network, each path indicating a route that at least one segment traverses;
for each identified path, determining each other path that is interdependent on the identified path so that when a failure is detected on the identified path each segment that traverses an interdependent path is also identified as being collocated with a least a portion of a failed segment; and
downloading to each restoration node the identification of the paths that are interdependent on the path of each segment connected to the restoration node.

8. A computer system for restoring a communications network following a failure in a distributed manner, the communications network having a plurality of restoration nodes, each restoration node for connecting segments of the communications network, each restoration node comprising:
a component for receiving an indication that a segment has failed;
a component for identifying each segment connected to the restoration node that is collocated with at least a portion of the failed segment;

a component for selecting a restoral route to bypass the failed segment, the restoral route using none of the identified segments; and a component for implementing the selected restoral route to bypass the failed segment.

9. The computer system of claim 8 including a component that, when failures on multiple segments are received, determines portions of each failed segment that are collocated; and wherein the identifying component identifies only those segments that are collocated with a determined portion.

10. The computer system of claim 8 including a component at a central computer system that prior to detecting the failure of the segment, identifies each path within the communications network, each path indicating a route that at least one segment traverses, and that for each identified path, determines each other path that is interdependent on the identified path so that when a failure is detected on the identified path each segment that traverses an interdependent path is also identified as being collocated with a least a portion of a failed segment.

11. The computer system of claim 8 including a table for mapping each port of the restoration node to the path of the segment to which it is connected wherein the table is used to identify the path of a failed segment.

12. The computer system of claim 8 including a table that contains an entry for each path of a segment connected to the restoration node with a listing of the paths that are interdependent on the path.

13. The computer system of claim 12 wherein interdependent paths are paths in which a portion of the paths are collocated.

14. A method in a computer system for excluding restoral routes from use in restoring a communications network following a failure, the method comprising:

prior to detecting a failure, for each segment of the communications network, creating a mapping from the segment to all segments that are collocated with at least a portion of the segment and downloading to each restoration node portions of the created mapping that relate to the restoration node; and after detecting a failure of a segment in the communications network at each restoration node, retrieving from the downloaded mapping an indication of all the segments that are collocated with at least a portion of the failed segment, and excluding the use in bypassing the failed segment of the indicated segments.

15. The method of claim 14 including when failures on multiple segments are detected, the retrieving retrieves the indications of only those segments that are collocated with a portion that is common to each failed segment.

16. The method of claim 14 including prior to detecting the failure of the segment,
identifying each path within the communications network, each path indicating a route that at least one segment traverses; and for each identified path, determining each other path that is interdependent on the identified path so that when a failure is detected on the identified path each segment that traverses an interdependent path is also identified as being collocated with a least a portion of a failed segment.

* * * * *